(12) United States Patent
Ewers

(10) Patent No.: US 9,638,334 B2
(45) Date of Patent: May 2, 2017

(54) FLOW CONTROL GATE FOR DETENTION POND

(71) Applicant: Alexander William Ewers, Rifle, CO (US)

(72) Inventor: Alexander William Ewers, Rifle, CO (US)

( * ) Notice: Subject to any disclaimer, the term of this patent is extended or adjusted under 35 U.S.C. 154(b) by 0 days.

(21) Appl. No.: 14/683,848

(22) Filed: Apr. 10, 2015

(65) Prior Publication Data

US 2016/0298774 A1 Oct. 13, 2016

(51) Int. Cl.
*F16K 3/02* (2006.01)
*F16K 31/30* (2006.01)
*E02B 7/20* (2006.01)

(52) U.S. Cl.
CPC ............ *F16K 3/0254* (2013.01); *E02B 7/205* (2013.01); *F16K 31/30* (2013.01)

(58) Field of Classification Search
CPC ...... F16K 3/0254; F16K 31/30; F16K 3/0218; E03B 7/205
See application file for complete search history.

(56) References Cited

U.S. PATENT DOCUMENTS

| | | | | |
|---|---|---|---|---|
| 3,942,328 A | * | 3/1976 | Bunger | ..................... E02B 7/46 405/96 |
| 4,225,434 A | * | 9/1980 | Ernst | ...................... E02B 7/205 137/397 |

* cited by examiner

*Primary Examiner* — Kevin Murphy
*Assistant Examiner* — Patrick Williams

(57) ABSTRACT

The flow control gate for detention ponds includes a movable gate that discharges fluid at a constant flow despite the depth of the fluid for a given depth range. The gate is moved by a lever that supports a float on the opposite end of the lever than the gate. As the fluid level around the flow control gate changes, the float tracks the changes, therefore raising and lowering the gate. Since the fluid head to discharge area relationship is not linear in the orifice equation, the curved track that the lever rests on is shaped in such a way so that the gate is moved non linearly to match the orifice equation. The flow control gate for detention ponds does not use electricity and can vastly reduce the required size of detention ponds.

1 Claim, 2 Drawing Sheets

FLOW CONTROL GATE FOR DETENTION POND

BACKGROUND OF THE INVENTION

The field of the invention relates to flow control devices and more specifically the fields of hydraulic and hydrologic engineering.

Detention ponds are required in most municipalities when a previously undisturbed area is developed resulting in a higher peak runoff discharge. The most common reason for a higher peak runoff is because of an increase in impervious area which decreases the area that water is able to percolate into the ground.

Current methods of restricting the post-development peak discharge to equal predevelopment discharge levels include using a stationary culvert, weir or a combination of the two. The use of these devices only allows the peak discharge to occur when the water level in the detention pond is at its peak height which usually occurs for a relatively short amount of time.

The flow control gate for detention pond allows the detention pond to discharge runoff at the peak pre-development flow rate as soon as the peak pre-development flow enters the detention pond. The gate is lowered and raised by means of a float monitored by a curved track so that the discharge always meets historical levels.

The orifice equation was the main equation used in the development of the flow control gate for detention pond. A widely accepted form of the orifice equation is $Q=C*A*\mathrm{sqrt}(2*g*h)$ where Q is the flow, C is the orifice coefficient, A is the area of the opening, g is the rate of gravitational acceleration and h is head. The orifice coefficient and gravitational acceleration are kept constant when the flow control gate for detention pond is operational. The head changes as the water raises and lowers in the detention pond which moves a float that controls the gate area so that the result is a constant flow no matter what the water level in the detention pond is. Other devices rely on electricity or more mechanisms that can easily be damaged and require much maintenance. By using the curved track for the flow control gate for detention pond there is no electricity required and we reduce the number of moving parts resulting in less chance of mechanical failure.

BRIEF SUMMARY OF THE INVENTION

A flow control gate for detention pond according to the invention comprises a gate mounted on an opening at or near its bottom edge and which opens and closes in dependence upon the water level in the basin at a amount regulated by a curved truck. The present invention comprising five main parts, a float, a lever, a curved track, a gate and a metal plate with a large opening. The lever supports the float and gate on opposite ends of the lever. The lever rests on the curved track so that when the float is raised by the water surface elevation rising, the gate is lowered and inversely when the float is lowered by the water surface elevation is receding, the gate is raised. The float floats so that the vertical distance between the float and the centroid of the orifice opening is equal to the head.

Unlike other inventions, this invention uses no electricity and very few moving parts to prevent mechanical failure and ensure more consistent functionality. The "Storm Overflow Basin" (Ernst, U.S. Pat. No. 4,225,434) uses a lever arm (113) that is susceptible to mechanical issues such as clogging and other mechanical issues. The flow control gate for detention pond is obviously different and superior when trying to avoid constant maintenance and ensure functionality because it uses a curved track which has many benefits. In addition to less clogging, using a curved track in which the lever rest on instead of a pinned system used by Ernst, it allows a wider range of motion allowing for a constant discharge for a wider range of water surface elevations. The flow control gate for detention pond is also easier to design for multiple depth and flow ranges because the float centroid is designed to stay at the water surface elevation instead of being submerged (Earnst, U.S. Pat. No. 4,225,434 FIG. 25).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
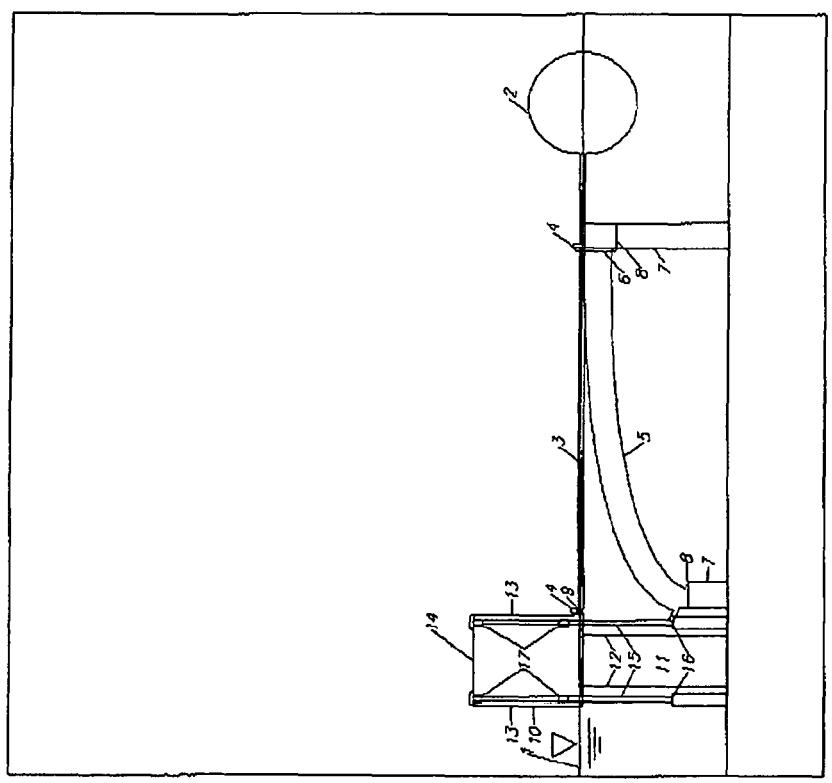
FIG. 1 illustrates a schematic view of the present invention when the gate is fully open and the water surface elevation is low
Figure 2:
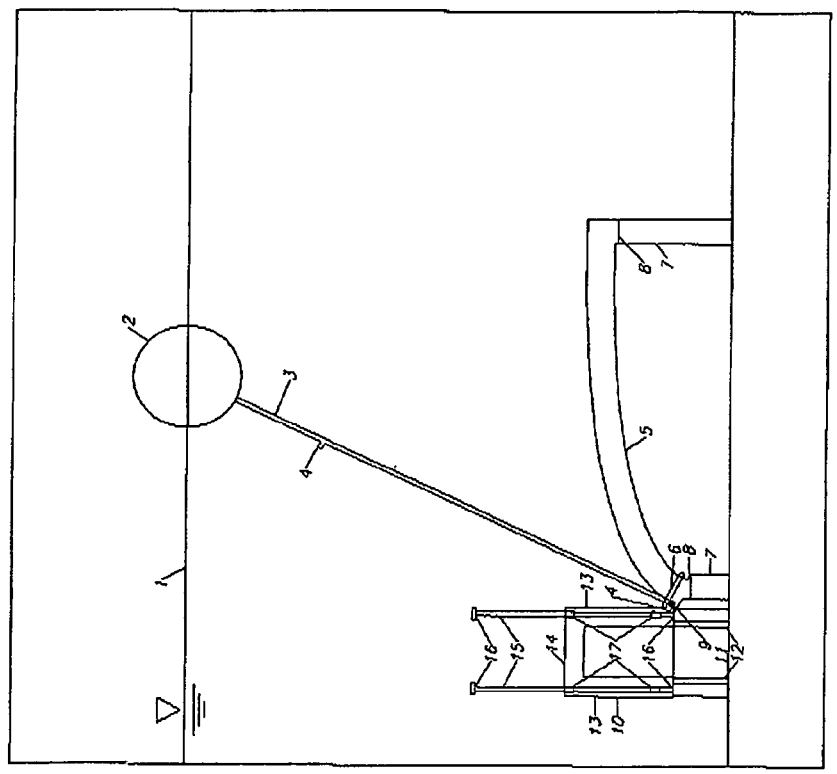
FIG. 2 illustrates a schematic view of the present invention when the gate is at its lowest point and the water surface elevation is at the maximum level the invention is designed for to keep a constant flow.

The flow control gate for detention pond is designed to restrict the discharge of a detention pond or similar non-pressurized water storage facility to a given flow for a given water surface elevation range. For example, if the historical discharge for a given basin is 30 cfs for the one-percent 24 hour storm event and the detention pond is 11 feet deep, including one foot of freeboard, then the flow control gate will be designed so that the discharge through the gate will never exceed 30 cfs for water surface elevations between zero and 10 feet.

As stated above in the "Background of the Invention" section, the primary equation used to design this invention was the orifice equation $Q=C*A*\mathrm{sqrt}(2*g*h)$. In a detention pond if the water is rising and receding then the constants in the equation are the area (A), gravity (g) and the orifice coefficient (C). For this invention, the goal was for the discharge through the orifice to be kept constant as well so the flow (Q) was kept constant in the equation. The head (h) changes when the water surface elevation in the pond changes assuming that the orifice does not move. In order to keep the flow discharge (Q) constant when the head (h) changes, the area (A) was chosen to be dependent upon the water surface elevation of the detention pond. For example, if the flow discharge (Q) was chosen to be a constant of 15 cfs, the orifice coefficient (C) was chosen to be a constant of 0.6 and gravity was chosen to be a constant of 32.2 ft/sec/sec then after re-arranging the variables and simplifying the equation of $A=3.12*h^{-0.5}$ would apply to find the required area (A) for any given head (h) to match the given discharge (Q) of 15 cfs in this case. It is important to note that when a required area is calculated based on the head, the head changes because, assuming a constant width of the hole, as the area decreases, the head (or distance between the centroid of the opening and the water surface elevation) changes. Therefore it is important to run through many iterations in order to come up with accurate areas for given water surface elevations as the inventor has already done.

The first piece of the present invention consist of a float 2. The float is suggested to be round so that as it rotates with the lever over the curved track, its centroid will be exactly at the water surface 1 elevation. An alternative to a round float 2 would be to have a float 2 that is able to freely rotate on the point that it is connected to the lever. It s suggested that the float 2 be made of a very sturdy material such as a hollow aluminum sphere so that it will keep a consistent shape and buoyancy for the duration of its life.

The lever 3 is connected to the float 2 either in a fixed position or free to rotate as described in the above paragraph. The lever 3 is placed on a curved track 5 so that it will not slide off of one side of the track 5 or the other. The lever 3 is to be made of a stiff material and should not flex easily and should be able to handle a substantial amount of force for the longevity of the invention. The lever 3 should have a stop block 4 on either end so that the wheeled runner 6 will keep the lever 3 from over rotating on either side when the lever 3 reaches its maximum or minimum angle at the maximum or minimum design water surface 1 elevation.

A wheeled runner 6 keeps the lever 3 connected to the curved track 5 but allows the lever 3 to freely rotate along the track 5 for the design range. The purpose of the wheeled runner 6 is so that the lever 3 does not move away from the curved track 5 and keeps it pressed along the track 5 so that one point of the lever 3 is always in contact with the curved track 5.

The curved track 5 is used because the relationship between the change in head and the change in area for a given flow is not linear. It is suggested that the curved track 5 be molded to fit the lever 3 snug against it so that it does not fall off. It is suggested that the curved track 5 be fixed on either end 7 but not the middle so that the wheeled runner 6 may freely move on the track's 5 sides and underneath. The track 5 should have stop blocks 8 under it similar to those on the lever 3/4 so that when the lever 3 is rotated to its maximum or minimum angle at the maximum or minimum water surface 1 elevation, the wheeled runner 6 keeps the lever 3 from over rotating.

On the opposite end of the lever 3 than the float 2, the lever 3 is hinged 9 to the gate 10. The gate 10 is raised and lowered by the lever 3 to control the area of the orifice 11. The gate 10 should be flush against the opening plate 12 so that no water leaks on the sides 13 or top 14 of the gate. It is suggested that the gate 10 is supported by two firm support rods 15 so that the gate 10 is free to move up and down on sliders 17 when the lever 3 raises it or lowers it but it will not move in any other dimension or rotate. The rods 15 should also have a stop block 16 on the top and bottom so that the gate 10 will never be raised too high or too low.

The opening 11 in the metal plate should be snug against the gate 10 so that no water could leak over 14 or to the sides 13 of the gate 10. It is suggested that the metal plate with the opening 12 be supported by a concrete structure so that it will not move due to erosion or the force of the water flowing through it.

The flow control gate for detention pond is to be designed for a certain storm event. It is suggested that an emergency weir or culvert be put in place above the designed water surface 1 elevation for the design storm event so that water is able to be discharged during more severe storm events without the detention pond overflowing.

In order to make mass production more efficient, the Flow Control Gate for Detention Pond can be designed for a given water surface elevation range and then the maximum discharge flow can be adjusted on a case-by-case basis by simply making the rectangular opening in the metal plate 11/12 wider or skinnier. For example, the device may be mass produce in three separate models for zero to five feet, zero to 10 feet and zero to 20 feet and then in order to change the maximum flow for each case, the hole 11 in the metal plate 12 will be cut at whatever width that flow demands for that specific case but the gate width, gate height and hole height will stay consistent for that given model.

The invention claimed is:

1. A flow control gate for a detention pond, comprising:
an outlet discharge path comprising a fixed rectangular opening and a movable gate, said movable gate having a top and a bottom, said top of said gate configured to be disposed above a top of said rectangular opening at all times, said bottom of said gate configured to never abut a bottom of said rectangular opening, a gap between said bottom of said gate and said bottom of said rectangular opening forming a discharge opening;
a plurality of support rods made of a rigid material and disposed along said gate such that the gate is configured to move up and down while being linearly guided by said support rods;
a float, said float having a centroid that is equal to a water surface level, wherein the float moves in response to changes in the water surface level;
a lever having a proximal end and a distal end, said lever fixed to the float at the distal end and to the gate at the proximal end, the lever configured to pivot about its proximal end in correspondence with movement of the float at its distal end;
a curved track connected to a base of one of the support rods, the curved track configured to connect to the lever and to guide the lever during movement of the lever by means of a wheeled runner, the wheeled runner circumscribing the curved track and being slidably connected to said lever such that the wheeled runner is displaced in correspondence with displacement of the lever;
wherein the flow control gate is configured to maintain a constant flow rate through the outlet discharge path over a predetermined range of water surface levels.

* * * * *